United States Patent
Poo et al.

(10) Patent No.: US 8,365,239 B2
(45) Date of Patent: Jan. 29, 2013

(54) DUAL TELEVISION TUNER

(75) Inventors: Teng Pin Poo, Singapore (SG); Henry Tan, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 1114 days.

(21) Appl. No.: 11/921,304

(22) PCT Filed: Jun. 1, 2006

(86) PCT No.: PCT/SG2006/000138
§ 371 (c)(1),
(2), (4) Date: Nov. 30, 2007

(87) PCT Pub. No.: WO2006/130116
PCT Pub. Date: Dec. 7, 2006

(65) Prior Publication Data
US 2009/0303394 A1 Dec. 10, 2009

(30) Foreign Application Priority Data
Jun. 1, 2005 (SG) ................................ 200503470-7

(51) Int. Cl.
*H04N 7/16* (2011.01)
(52) U.S. Cl. ........................................ 725/151
(58) Field of Classification Search ................... 725/151
See application file for complete search history.

(56) References Cited

U.S. PATENT DOCUMENTS

| 5,757,441 A | 5/1998 | Lee et al. |
| 2002/0035729 A1 | 3/2002 | Diep |
| 2003/0038897 A1 | 2/2003 | Shiotsu |
| 2004/0252562 A1 | 12/2004 | Kim |
| 2005/0195335 A1 | 9/2005 | Gomez et al. |
| 2005/0254498 A1* | 11/2005 | Itoh ............................... 370/394 |

FOREIGN PATENT DOCUMENTS

| DE | 19803058 A | 9/1999 |
| EP | 1420587 A1 | 5/2004 |
| JP | 2004-312595 A | 11/2004 |
| PA | J 2004-312595 | 11/2004 |

OTHER PUBLICATIONS

Supplementary European Search Report and European Search Opinion for European Appl. No. EP 06 75 8109, issued Oct. 21, 2010.

* cited by examiner

*Primary Examiner* — Dominic D Saltarelli
(74) *Attorney, Agent, or Firm* — Jacobson Holman PLLC

(57) ABSTRACT

A dual television tuner having a television tuner module and a wireless local area network module both operatively connected to an antenna for receiving a television signal from the antenna, and for passing the television signal for playing on a host to which the dual television tuner is able to be operatively connected.

27 Claims, 3 Drawing Sheets

DUAL TELEVISION TUNER

REFERENCE TO RELATED APPLICATIONS

This is a national stage of International Application No. PCT/SG2006/000138 filed on Jun. 1, 2006 and published in English.

Reference is made to the earlier-filed applications U.S. Ser. No. 10/508,646 filed Sep. 15, 2004 for the invention "Portable Apparatus for Enabling Reproduction of Television" (published Mar. 9, 2006 as US2006/0051071) and international application PCT/SG2004/000276 filed Sep. 1, 2004 for the invention "Portable Apparatus for Enabling Reproduction of Television" (published Mar. 9, 2006 as WO2006/025794) (the "Earlier Applications"), both naming the same inventors as the present application, the contents of which are hereby incorporated by reference. U.S. Ser. No. 10/508,646 is the U.S. national stage of international application PCT/SG2004/000276.

FIELD OF THE INVENTION

This invention relates to a dual television tuner and refers particularly, though not exclusively, to a portable apparatus for enabling reproduction of television that has at least two separate television tuners.

BACKGROUND OF THE INVENTION

In the Earlier Applications there is disclosed a portable apparatus for enabling reproduction of television. However, it has been found that in certain areas, where the television signal may be weak, that the reception is not of an acceptable standard.

Also, it has been found that some of the operating characteristics of the earlier Applications make it suitable for performing more than one function.

SUMMARY OF THE INVENTION

In accordance with a first preferred aspect there is provided a dual television tuner comprising a television tuner module and a wireless local area network module both operatively connected to an antenna for receiving a television signal from the antenna, and for passing the television signal for playing on a host to which the dual television tuner is able to be operatively connected.

At any one time only one of the television tuner module and the wireless local area network module may be able to pass the television signal for playing on the host.

The dual television tuner may further comprise a decoder for decoding the television signal received from the antenna.

Preferably, the wireless local area network module is activated only if there is no television signal received by the television tuner module, or if the television signal received by the television tuner module is below an acceptable quality.

Alternatively or additionally, both the wireless local area network module and the TV tuner module are able to be activated at the one time, a micro controller being provided for determining which of them has the better television signal and, following the determination, keeping activated that of the wireless local area network module and the TV tuner module having the better television signal, and deactivating the other.

The dual television tuner may further comprise a memory module and a micro-controller. The dual television tuner may be portable and may be able to be used with varying hosts.

According to a second aspect there is provided a method of tuning a television signal received from an antenna and for playing on a host. The method comprises activating a television tuner of a portable apparatus operatively connected to the host module; scanning for a signal from the television tuner module; and determining if the signal is available from the television tuner module. If there is no signal from the television tuner module, the television tuner module is deactivated, and a wireless local area network module of the portable apparatus is activated. Scanning for the signal from the wireless local area network module then takes place.

After the scanning of the TV tuner module further scanning may be conducted a predetermined number of times. If there is no signal from the wireless local area network, rescanning is conducted for the predetermined number of times. If there is no signal from the wireless local area network module following rescanning the predetermined number of times, the wireless local area network module is deactivated and a no signal received message is sent to the host. If in either case there is the signal, a channel is selected and played on the host. If required, the signal may be decoded before being played on the host.

Accordingly to a third aspect there is provided a method of tuning a television signal received from an antenna and for playing on a host. The method comprises activating a television tuner module and a wireless local area network module, both being of a portable apparatus and both being operatively connected to the antenna. Scanning for a signal from both the television tuner module and the wireless local area network module takes place and, if both the television tuner module and the wireless local area network module provide the signal, which one of the television tuner module and the wireless local area network module provides a better signal is determined. That of the television tuner module and the wireless local area network module that provides the better signal is kept active. That of the television tuner module and the wireless local area network module that does not provide the better signal is deactivated.

If there is no signal from both of the television tuner module and the wireless local area network module, rescanning may take place for a predetermined number of times. If after rescanning takes place for the predetermined number of times there is still no signal from both of the television tuner module and the wireless local area network module, both the television tuner module and the wireless local area network module may be deactivated and a no signal received message may be sent to the host.

A channel may be selected and played on the host by that which remains active.

If required, the better signal may be decoded before being played on the host.

If the signal is from only one of the television tuner module and the wireless local area network module, that not providing the signal is deactivated and that providing the signal remains activated.

If the better signal falls below an acceptable quality, the method is repeated. Preferably, that activated remains activated until the repeated method is complete.

BRIEF DESCRIPTION OF THE DRAWINGS

In order that the present invention may be fully understood and readily put into practical effect, there shall now be described by way of non-limitative example only preferred embodiments of the present invention, the description being with reference to the accompanying illustrative drawings.

In the drawings.

DETAILED DESCRIPTION OF THE PREFERRED EMBODIMENTS

Figure 1:
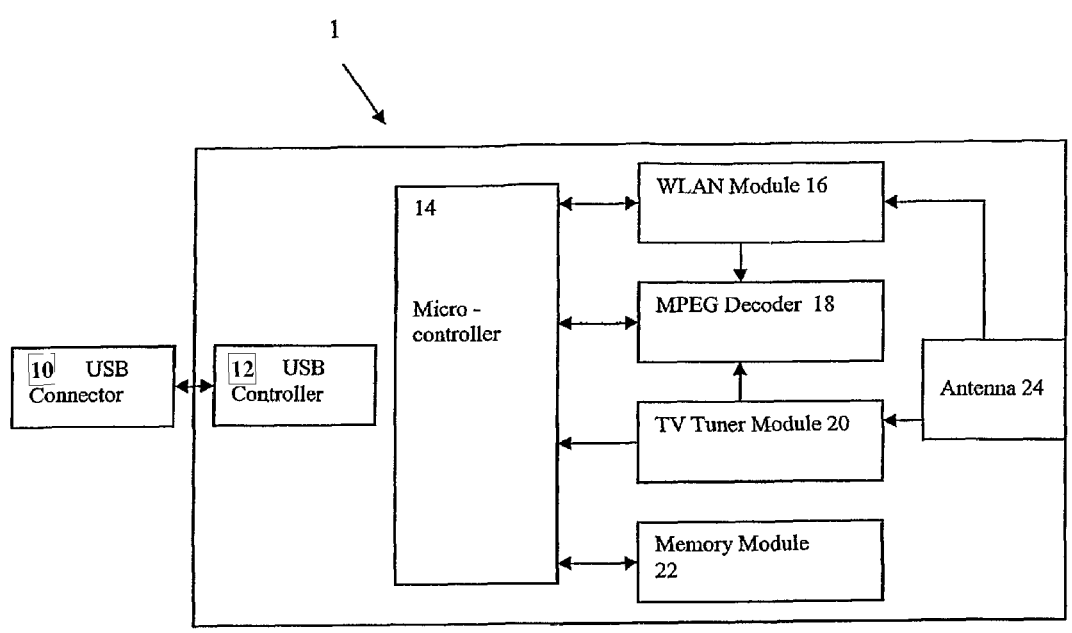
FIG. 1 is a block diagram of a preferred embodiment.

To first refer to FIG. 1, there is shown a portable device 1 that consists of the following basic components:
a) a USB connector 10,
b) a USB controller 12,
c) a micro controller 14,
d) a wireless LAN module 16,
e) an optional MPEG decoder 18,
f) a TV tuner module 20,
g) a memory module 22, and
h) an antenna 24.

This device 1 is able to function as a USB mass storage device, a TV signal receiver and tuner, and is wireless LAN enabled. The memory module 22 may be one or more of:
a) NAND flash memory;
b) AG and Flash memory, and
c) a disk drive, preferably a hard disk drive.

The TV tuner module 20 is as described in the Earlier Applications and is able to receive at least one of the standard digital television signals. These may be one or more of:
a) DVB-t,
b) ATSC,
c) ISDB-T, and
d) DMB If required or desired, an MPEG decoder 18, or other form of decoder, is provided. If any received signal is in an MPEG format, or other standard format, it will be decoded and sent to a host to enable viewing of a TV program on the host.

The wireless local area network ("WLAN") module 16 has at least one of the following wireless protocols.
a) IEEE802.11
b) Bluetooth
c) IrDA,
d) WiMAX, and
e) WUSB The WLAN module 20 is able to be configured to connect to Access Point, communicate with other device with wireless functionality, and is able to receive a TV signal.

In this way any television signal received by antenna 24 is passed to the WLAN module 16 as well as the TV tuner module 20. It is then processed by either or both modules 16, 24 and passed through controllers 14, 12 and connector 10 to enable viewing of the television program on the host (not shown).

The device may also be used for radio signals in the same manner.

Furthermore, the device can be used as a memory module in the usual manner with WLAN module 16, MPEG decoder 18, TV tuner module 20 and antenna 24 being deactivated.

Figure 2:
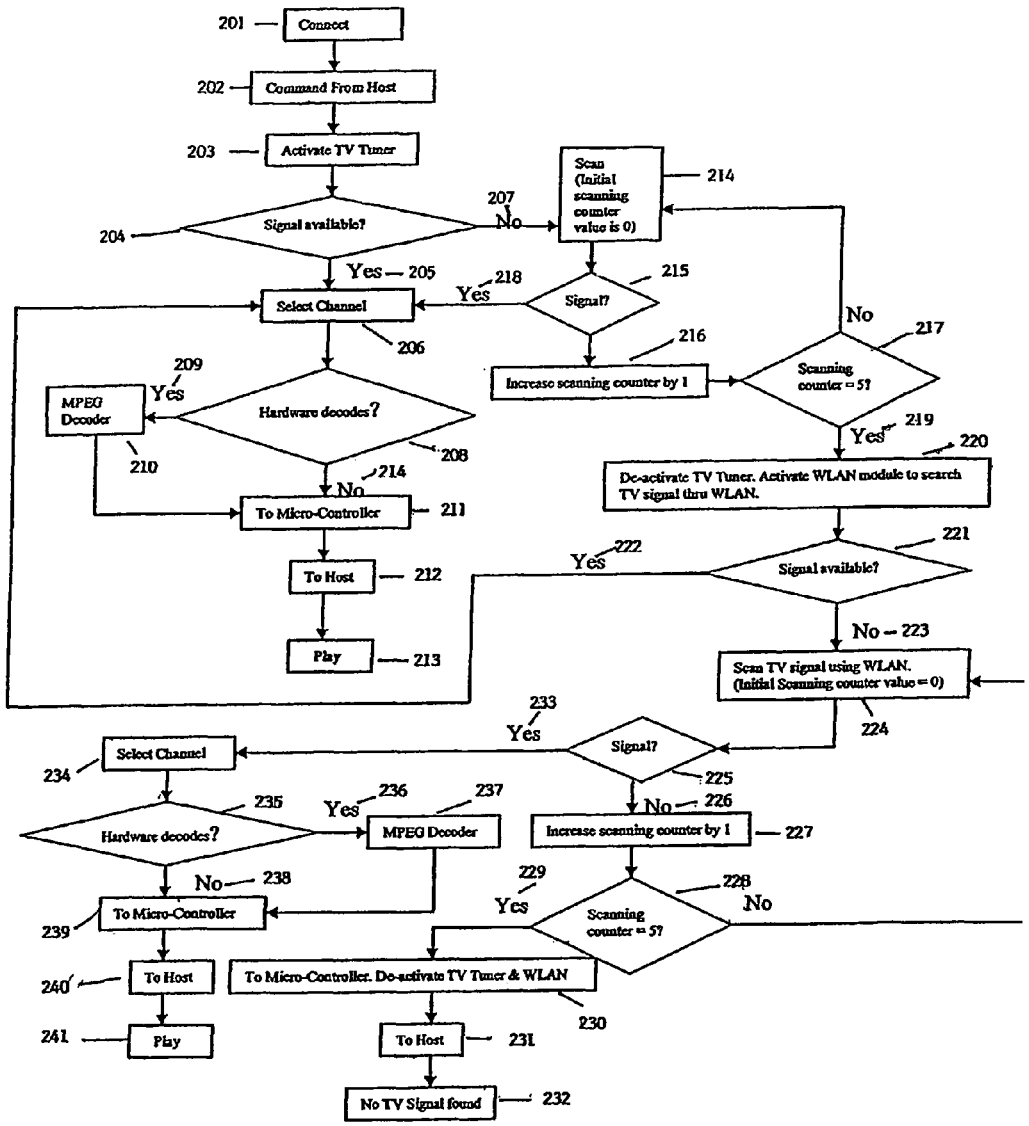
FIG. 2 is a first flow chart of a first embodiment.

To now refer to FIG. 2, when the connector 10 is connected (201) to a host such as, for example, a PC or a PDA, it waits on a command from the host (202). If a command is received, the TV tuner 20 is activated (203). A check is made to determine TV signal availability (204). If yes (205) then a channel is selected (206). If no (207) the process described below is followed. From (206), the controller 14 then checks if decoding is required (208). If yes (209) it passes the TV signal (210) to MPEG decoder 18 for decoding. The decoded signal/encoded signal is then passed to the micro controller 14 (211) and the decoded signal/encoded signal is passed to the host (212) for the playing of the TV program (213) on the host. If no decoding (214) is required at (208), the process proceeds directly to step (211) from step (208).

If no (207) at (204), the TV tuner module 20 rescans for a TV signal for a predetermined number of times (214). The predetermined number may be in the range 2 to 10, preferably 5. The cycle continues through steps (215), (216) and (217). As soon as a signal is available (218), the process reverts to (206). If no signal is available when the predetermined number is reached (219) the WLAN module 16 is activated and, preferably, the TV tuner module 20 is deactivated (220).

The WLAN module 20 then scans for a signal (221). If a signal is available (222) proceeds to select a channel (206). If no signal is available (223), rescanning for the same predetermined number of times takes place (224) to (227). If after the predetermined number of scans there is no signal, a "No Signal Found" message is generated and sent to the micro controller 14 (230), USB controller 12 then to the host (231) for display (232). The WLAN module 20 is then deactivated. If yes at (233), at (225) the process proceeds through (234) to (241). These are identical to (206) to (213) described above.

The decoding at (208) and (235) may be hardware, software or firmware.

Also, if at any time the signal from the TV tuner module 20 at (204) is not of an acceptable quality, the process may revert to (207). Preferably, the signal from the TV tuner module 20 is maintained until any replacement signal is processed.

Figure 3:
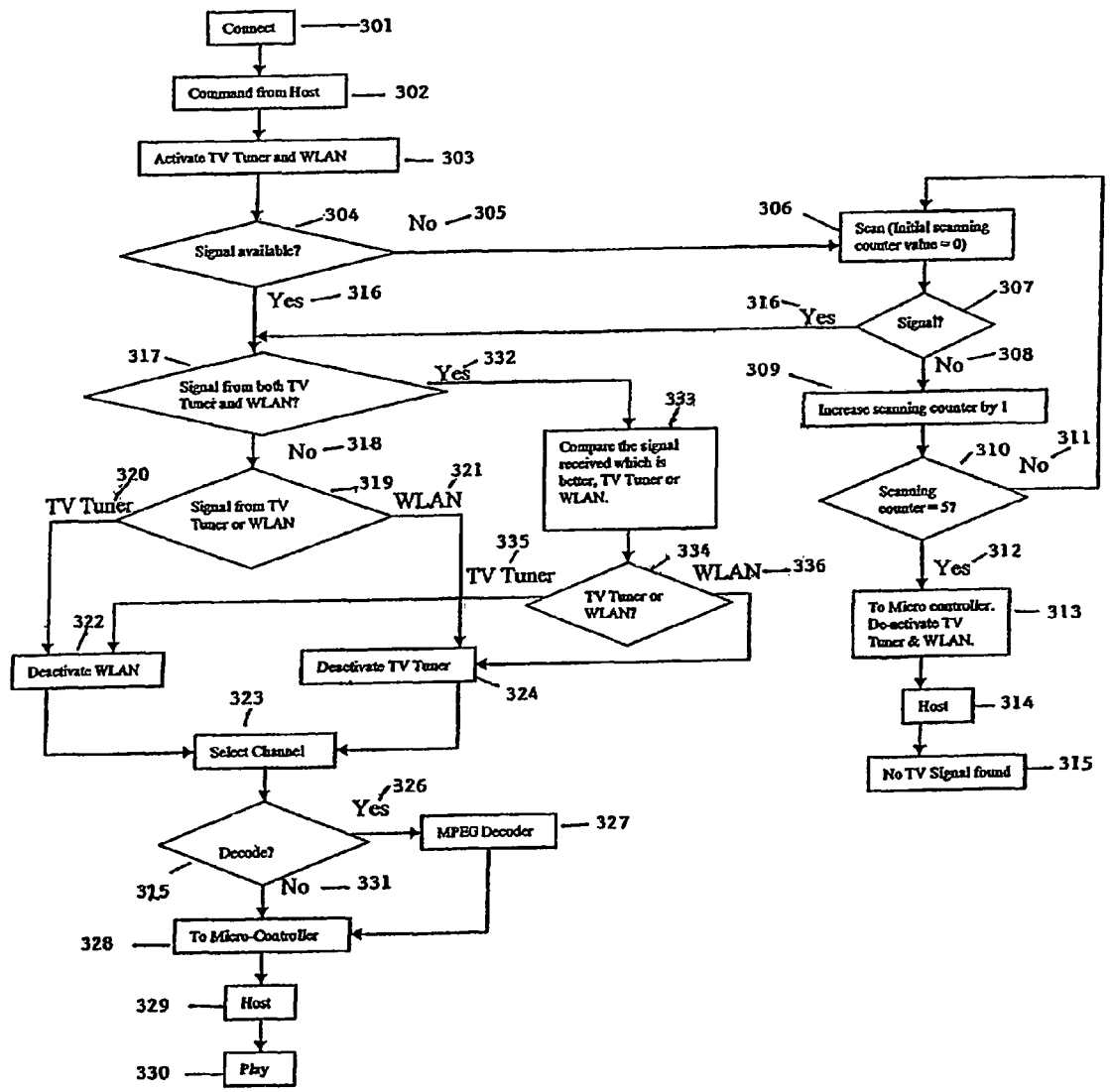
FIG. 3 is a second flow chart of a second embodiment.

To now refer to FIG. 3, in (301) the connector 10 is operatively connected to a host (not shown) and receives a command from the host (302). The TV tuner module 20 and the WLAN module 16 are both activated at substantially the same time (303). A check is made to determine if a signal is available (304) from either or both of them. If not (305), rescanning takes place (306) to (311) in the same manner as for the embodiment of FIG. 2. If after the predetermined number of attempts there is no signal (312) the "No Signal Found" process of (313) to (315) takes place in the same manner as for the embodiment of FIG. 2.

If yes (316) at (307) or (304), a check is made to determine if the TV signal is from both TV tuner module 20 and WLAN module 16 (317). If not from both (318) a check is made (319) to determine if the signal is from TV tuner 20 or WLAN (321). If the signal is from TV tuner module 20, the WLAN 16 is deactivated (322) and the process goes to select channel (323). If from the WLAN module 16, the TV tuner 20 is deactivated (324) and the process goes to select channel (323).

After the channel is selected at (323), a check is made to determine if decoding is needed (325). If yes (326) the TV signal is passed to MPEG decoder 18 to decode, and the decoded signal/encoded signal is passed to the micro controller 14 (328), and then to the host (329) to play the TV Program (330). If at (325) no decoding is needed (331) the process passes directly from (325) to (328).

If at (317) the signal is from both the TV tuner 20 and the WLAN 16 (332), the signals are compared (333, 334) to determine which signal is better—the TV tuner 20 or the WLAN 16. If it is the TV tuner 20 (335), the process proceeds to (322) and the WLAN 16 is deactivated; but if it is the WLAN 16 (336), the process proceeds to (324), and the TV tuner 20 is deactivated. That not deactivated remains activated.

The process then proceeds from step (323) to step (330), as is described above.

The received TV signal quality may be monitored on a regular basis and the process from (317) to (330) is followed. The monitoring may be by regular sampling of the TV signal and, if it drops below a preset or acceptable quality level, the process from (317) will be followed. In this way both the TV tuner 20 and the WLAN module 16 are not both active for any substantial period, thus reducing power consumption. They are both on only during the turning process, and not the playing time. If the signal does drop below the preset or acceptable quality level, it is maintained until the process (333, 334) is completed.

Whilst there has been described in the foregoing description preferred embodiments of the present invention, it will be understood by those skilled in the technology concerned that many variations or modifications in details of design or construction may be made without departing from the present invention.

The invention claimed is:

1. A portable, self-contained, and independently operating USB mass storage device configured as a peripheral device for external connection to a host computer and usable for storing data and as a dual television tuner, and comprising:
   no more that a single physical data port, wherein the data port comprises a USB connector for connection to the host computer;
   a memory module for receiving and storing data from the host computer when the USB mass storage device is used as a conventional memory module;
   a selectively activatable and deactivatable antenna;
   a selectively activatable and deactivatable television tuner module and a selectively activatable and deactivatable wireless local area network module both operatively connected to the antenna for receiving a television signal from the antenna, and for passing the television signal for playing on the host computer when the USB mass storage device is operatively connected to the host computer by the USB connector;
   a selectively activatable and deactivatable decoder for decoding the television signal received from the antenna before the television signal is passed for playing on the host computer, if decoding is required; and
   a microcontroller for causing only one of the television tuner module and the wireless local area network module to pass the television signal at any one time for playing on the host computer, and wherein the microcontroller deactivates the antenna, the television tuner module, the wireless local area network module, and the decoder in response to the memory module receiving and storing data.

2. The USB mass storage device usable as a dual television tuner, as claimed in claim 1, wherein the microcontroller further determines whether a signal of acceptable quality is received by the television tuner module, and activates the wireless local area network module only if there is no television signal received by the television tuner module, or if the television signal received by the television tuner module is below an acceptable quality.

3. The USB mass storage device usable as a dual television tuner, as claimed in claim 1, wherein the microcontroller allows both the wireless local area network module and the television tuner module a to be activated at the one time, and determines which of them has the better television signal and, following the determination, keeps activated that of the wireless local area network module and the television tuner module having the better television signal and deactivates the other.

4. A method of tuning a television signal and storing data using the USB mass storage device of claim 1 operatively connected to a host computer, the method comprising:
   (a) connecting the single physical data port of the USB mass storage device to the host computer;
   (b) activating the television tuner module of the portable USB mass storage device, upon receipt of a command from the host computer;
   (c) scanning for a signal from the television tuner module;
   (d) determining if a signal is available from the television tuner module;
   (e) if there is no signal from the television tuner module, deactivating the television tuner module and activating the wireless local area network module of the portable USB mass storage device;
   (f) scanning for a signal from the wireless local area network module; and
   (g) if the memory module is to be used to receive and store data, using the microcontroller to deactivate the antenna, the television tuner module, the wireless local area network module, and the decoder.

5. The method as claimed in claim 4, wherein after step (b), the scanning of step (c) is conducted a predetermined number of times before continuing to step (e).

6. The method as claimed in claim 5, wherein if in step (f) there is no signal from the wireless local area network module, rescanning is conducted for the predetermined number of times.

7. The method as claimed in claim 6, wherein if there is no signal from the wireless local area network module following rescanning the predetermined number of times, the wireless local area network module is deactivated and a no signal received message is sent to the host computer.

8. The method as claimed in claim 4, wherein in step (d) if there is a signal, a channel is selected and played on the host computer.

9. The method as claimed in claim 8 further comprising decoding the signal before playing the channel on the host computer.

10. The method as claimed in claim 4, wherein if there is a signal from the wireless local area network module, a channel is selected and played on the host computer.

11. A method of storing data and tuning a television signal received from the antenna of the USB mass storage device of claim 1 and for playing on a host computer operatively connected to the USB mass storage device, the method comprising:
   (a) connecting the single physical data port of the USB mass storage device to the host computer;
   (b) activating the television tuner module and the wireless local area network module of the portable USB mass storage device, upon receipt of a command from the host computer;
   (c) scanning for a signal from both the television tuner module and the wireless local area network module;
   (d) if both the television tuner module and the wireless local area network module provide the signal, determining which one of the television tuner module and the wireless local area network module provides a better signal;
   (e) keeping active that of the television tuner module and the wireless local area network module that provides the better signal and sending the better signal for playing on the host computer;
   (f) deactivating that of the television tuner module and the wireless local area network module that does not provide the better signal; and
   (g) if the memory module is to be used to receive and store data, using the microcontroller to selectively deactivate the antenna, the television tuner module, the wireless local area network module, and the decoder.

12. The method as claimed in claim 11, wherein if in step (c) there is no signal from both of the television tuner module and the wireless local area network module, rescanning takes place for a predetermined number of times.

13. The method as claimed in claim 12, wherein if after rescanning takes place for the predetermined number of times there is still no signal from either of the television tuner module and the wireless local area network module, both the television tuner module and the wireless local area network module are deactivated and a no signal received message is sent to the host computer.

14. The method as claimed in claim 11, wherein in step (e) a channel is selected and played on the host computer.

15. The method as claimed in claim 14 further comprising decoding the better signal before being played on the host computer.

16. The method as claimed in claim 11, wherein in step (c) if the signal is from only one of the television tuner module and the wireless local area network module, that not providing the signal is deactivated and that providing the signal remains activated.

17. The method as claimed in claim 11, wherein if the better signal falls below an acceptable quality, steps (b) to (f) are repeated.

18. The method as claimed in claim 17, wherein during the repeating of steps (b) to (f), step (e) is maintained until the repeating reaches the end of step (d).

19. A USB mass storage device configured as a peripheral device for external connection to a host computer and usable for storing data and as a dual television tuner and as a conventional memory module, and comprising:
   no more that a single physical data port, wherein the data port comprises a USB connector for connection to the host computer;
   a memory module for receiving and storing data from the host computer when the USB mass storage device is used as a conventional memory module;
   a selectively activatable and deactivatable antenna,
   a selectively activatable and deactivatable television tuner module and a selectively activatable and deactivatable wireless local area network module both operatively connected to the antenna for receiving a television signal from the antenna, and for passing the television signal for playing on a host computer to which the USB mass storage device is operatively connectable;
   a selectively activatable and deactivatable decoder for decoding the television signal received from the antenna before the television signal is passed for playing on the host computer, if decoding is required; and
   a microcontroller for activating only the television tuner module in response to a command received from the host computer and determining whether a signal is available from the television tuner module, and upon a determination that a signal is not available from the television tuner module, activating the wireless local area network module and deactivating the television tuner module, wherein at any one time only one of the television tuner module and the wireless local area network module is able to pass the television signal for playing on the host computer, and wherein the microcontroller deactivates the antenna, the television tuner module, the wireless local area network module, and the decoder in response to the memory module receiving and storing data.

20. The USB mass storage device usable as a dual television tuner, as claimed in claim 19, wherein the microcontroller further determines whether a signal of acceptable quality is received by the television tuner module, and activates the wireless local area network module only if there is no television signal received by the television tuner module, or if the television signal received by the television tuner module is below an acceptable quality.

21. A method of tuning a television signal and storing data using the USB mass storage device of claim 19 operatively connected to a host computer, the method comprising:
   (a) activating only the television tuner module of the portable USB mass storage device, upon receipt of a command from the host computer;
   (b) scanning for a signal from the television tuner module;
   (c) determining if a signal is available from the television tuner module;
   (d) if there is no signal from the television tuner module, deactivating the television tuner module and activating the wireless local area network module of the USB mass storage device;
   (e) scanning for a signal from the wireless local area network module; and
   (f) if the memory module is to be used to receive and store data from the host computer, using the microcontroller to deactivate the antenna, the television tuner module, the wireless local area network module, and the decoder.

22. The method as claimed in claim 21, wherein after step (a) the scanning of step (b) is conducted a predetermined number of times before continuing to step (d).

23. The method as claimed in claim 22, wherein if in step (e) there is no signal from the wireless local area network module, rescanning is conducted for the predetermined number of times.

24. The method as claimed in claim 23, wherein if there is no signal from the wireless local area network module following rescanning the predetermined number of times, the wireless local area network module is deactivated and a no signal received message is sent to the host computer.

25. The method as claimed in claim 21, wherein in step (c) if there is a signal, a channel is selected and played on the host computer.

26. The method as claimed in claim 25 further comprising decoding the signal before playing the channel on the host computer.

27. The method as claimed in claim 21, wherein if there is a signal from the wireless local area network module, a channel is selected and played on the host computer.

* * * * *